(12) United States Patent
Acar

(10) Patent No.: US 7,461,552 B2
(45) Date of Patent: Dec. 9, 2008

(54) DUAL AXIS RATE SENSOR

(75) Inventor: Cenk Acar, Irvine, CA (US)

(73) Assignee: Custom Sensors & Technologies, Inc., Moorpark, CA (US)

( * ) Notice: Subject to any disclaimer, the term of this patent is extended or adjusted under 35 U.S.C. 154(b) by 109 days.

(21) Appl. No.: 11/552,006

(22) Filed: Oct. 23, 2006

(65) Prior Publication Data
US 2008/0092652 A1 Apr. 24, 2008

(51) Int. Cl.
*G01P 9/04* (2006.01)

(52) U.S. Cl. ............... 73/504.04; 73/504.12; 73/504.14

(58) Field of Classification Search ............. 73/504.02, 73/504.04, 504.12, 504.14, 504.08, 504.09, 73/510, 511
See application file for complete search history.

(56) References Cited

U.S. PATENT DOCUMENTS

| | | | |
|---|---|---|---|
| 5,869,760 A | 2/1999 | Geen | |
| 6,076,401 A * | 6/2000 | Okada | 73/504.12 |
| 6,481,283 B1 | 11/2002 | Cardarelli | |
| 6,494,094 B1 * | 12/2002 | Tsugai et al. | 73/504.12 |
| 6,508,122 B1 | 1/2003 | McCall et al. | |
| 6,796,178 B2 | 9/2004 | Jeong et al. | |
| 6,837,107 B2 * | 1/2005 | Geen | 73/504.04 |
| 6,892,575 B2 | 5/2005 | Nasiri et al. | |
| 6,928,872 B2 | 8/2005 | Durante et al. | |
| 7,240,552 B2 * | 7/2007 | Acar et al. | 73/504.12 |
| 7,250,112 B2 * | 7/2007 | Nasiri et al. | 216/2 |
| 7,284,429 B2 * | 10/2007 | Chaumet et al. | 73/504.12 |

* cited by examiner

*Primary Examiner*—Helen C. Kwok
(74) *Attorney, Agent, or Firm*—Edward S. Wright

(57) ABSTRACT

Angular rate sensor for detecting rotation about first and second mutually perpendicular axes which has first and second masses coupled together for torsional drive mode oscillation of equal amplitude and opposite phase about third axes which are perpendicular to the first and second axes. The first mass is mounted for oscillation about the second axis in response to Coriolis forces produced by rotation about the first axis, and the second mass is mounted for oscillation about the first axis in response to Coriolis forces produced by rotation about the second axis. In some disclosed embodiments, the rate sensor also includes a pair of accelerometer masses which are connected together for torsional movement of equal amplitude and opposite phase about axes parallel to the third axes in response to acceleration along the second axis and for torsional movement of equal amplitude and opposite phase about axes parallel to the second axis in response to acceleration along the third axes.

30 Claims, 5 Drawing Sheets

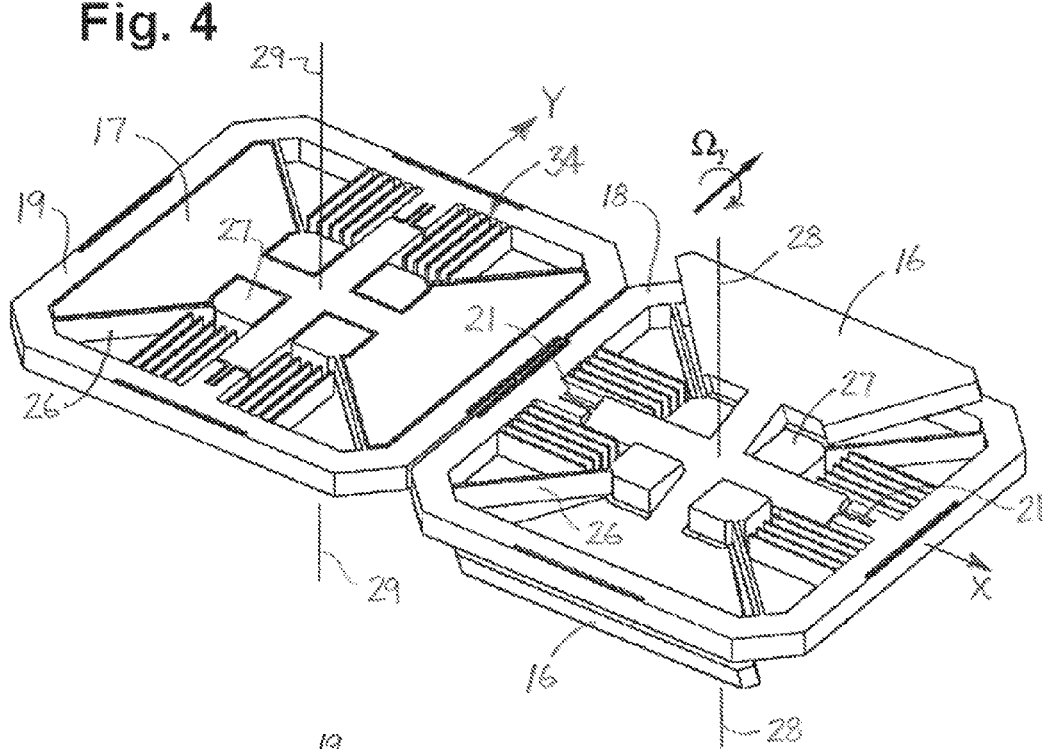
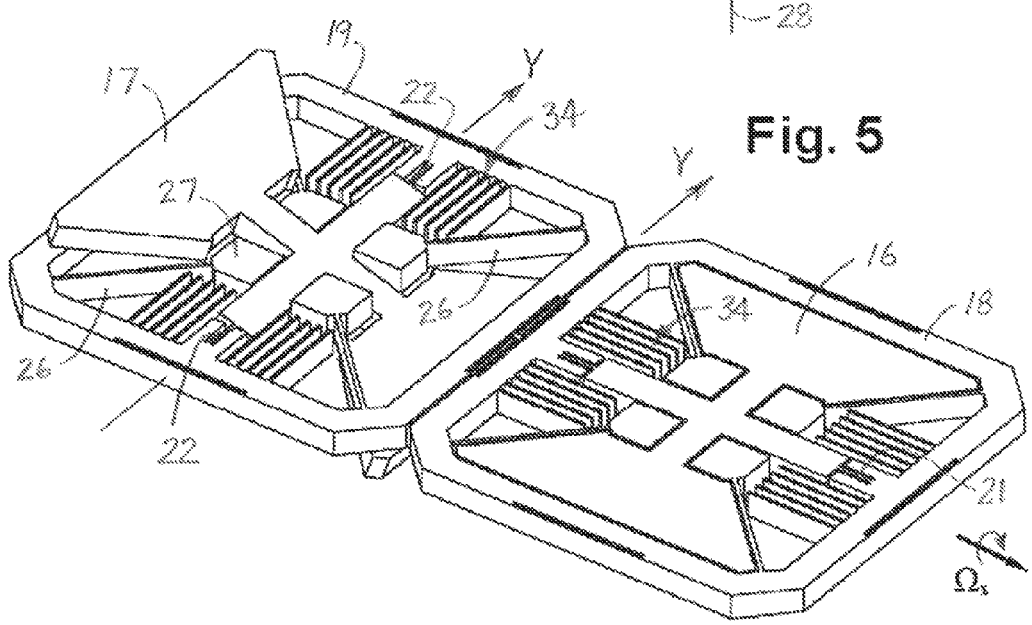

DUAL AXIS RATE SENSOR

BACKGROUND OF THE INVENTION

1. Field of Invention

This invention pertains generally to angular rate sensors and, more particularly, to a rate sensor for monitoring rotation about two input axes.

2. Related Art

Many automotive applications require measurement of angular rate about two orthogonal axes. Currently, the most common solution is to include two separate rate sensors, or gyroscopes, on the same circuit board, oriented in an orthogonal configuration. However, this solution requires two separate sensors with two separate application-specific integrated circuits (ASICs) for drive control and sensing, and two separate packages for each sensor.

OBJECTS AND SUMMARY OF THE INVENTION

It is in general an object of the invention to provide a new and improved angular rate sensor for monitoring rotation about two input axes.

Another object of the invention is to provide a rate sensor of the above character which overcomes the limitations and disadvantages of rate sensors heretofore provided.

These and other objects are achieved in accordance with the invention by providing an angular rate sensor for detecting rotation about first and second mutually perpendicular axes which has first and second masses coupled together for torsional drive mode oscillation of equal amplitude and opposite phase about third axes which are perpendicular to the first and second axes. The first mass is mounted for oscillation about the second axis in response to Coriolis forces produced by rotation about the first axis, and the second mass is mounted for oscillation about the first axis in response to Coriolis forces produced by rotation about the second axis. In some embodiments, the rate sensor also includes a pair of accelerometer masses which are connected together for torsional movement of equal amplitude and opposite phase about axes parallel to the third axes in response to acceleration along the second axis and for torsional movement of equal amplitude and opposite phase about axes parallel to the second axis in response to acceleration along the third axes.

BRIEF DESCRIPTION OF THE DRAWINGS

FIGS. 4 and 5 are operational views, illustrating the sense mode responses of the embodiment of FIG. 1 to rotation about two orthogonal input axes.

DETAILED DESCRIPTION

Figure 1:
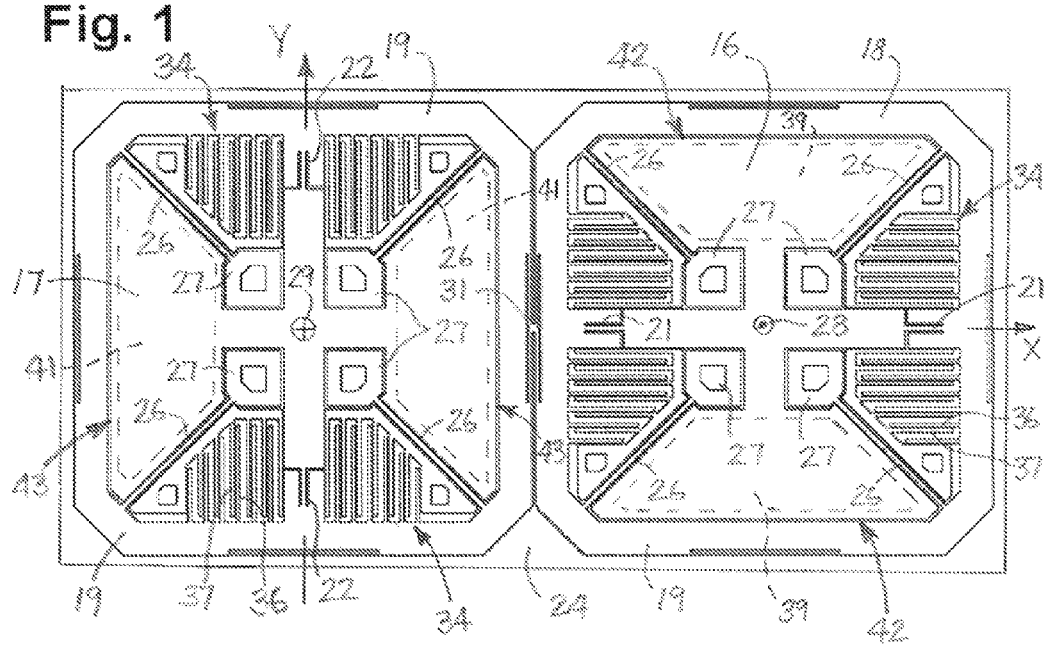
FIG. 1 is a top plan view of one embodiment of an angular rate sensor incorporating the invention.
Figure 2:
FIG. 2 is a block diagram of the embodiment of FIG. 1.
Figure 3:
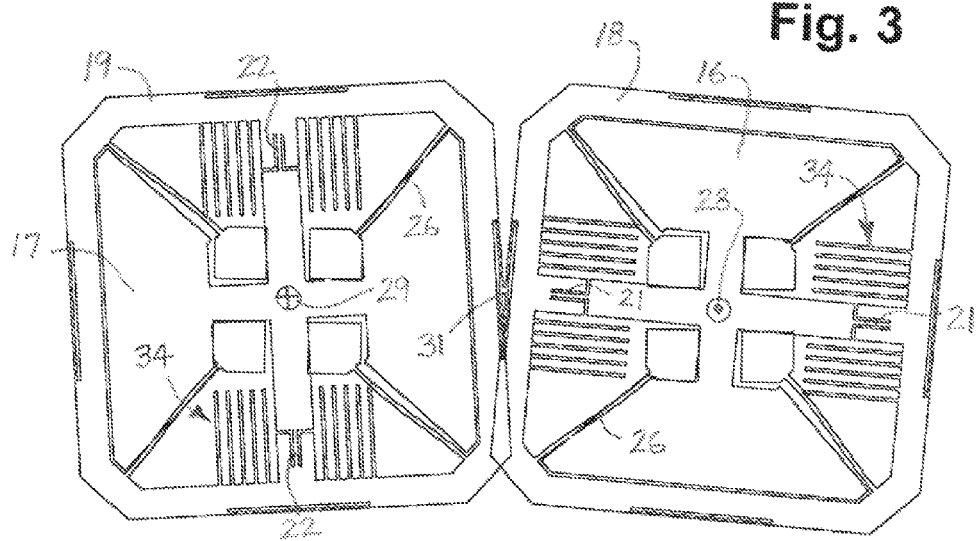
FIG. 3 is an operational view, illustrating the drive mode oscillation of the embodiment of FIG. 1.

As illustrated in FIG. 1, the rate sensor has a pair of generally planar, butterfly-shaped proof masses 16, 17 which lie in an x, y reference plane when the device is at rest. The proof masses are mounted in gimbals 18, 19 by torsion beams 21, 22. Beams 21 extend along the x axis and constrain proof mass 16 for out-of-plane rotation about the x axis, and beams 22 extend along the y axis and constrain mass 17 for rotation about that axis. Like the masses, the gimbals are generally planar and are disposed in the x, y plane.

The gimbals and the proof masses are suspended above a substrate 24 by flexible beams, or flexures, 26 which extend between anchors 27 affixed to the substrate and the gimbals. These beams are flexible only in the x, y plane, and constrain the gimbals and the masses for in-plane torsional rotation about axes 28, 29 which are located at the centers of the masses and extend in a direction parallel to the z axis and perpendicular to the substrate and to the gimbals. In the embodiment illustrated, anchors 27 are spaced in quadrature about the centers of the masses, with beams 26 extending diagonally at angles of approximately 45° to the x and y axes.

The midpoints of the adjacent sides of the gimbals are connected together by a coupling link 31 which constrains the gimbals and the proof masses so that the movement of the two masses about axes 28, 29 is precisely out of phase and equal in magnitude. This assures that the angular drive momentum is perfectly balanced, and the device does not inject any vibration energy into the substrate. The rigid link also eliminates the undesired parasitic resonant modes that could interfere with the drive-mode.

The four suspension beams 26 which connect the gimbals, or drive-mode frames, to the anchors close to the center of each mass form a torsional in-plane drive-mode oscillator for that mass. The large out-of-plane stiffness of the drive beams minimizes the out-of-plane deflection of the structure that could interfere with the sense mode motion. Because of the effective constraining of motion, the torsional oscillators deflect minimally due to in-plane acceleration, suspending the proof masses from anchors close to the center of the structure minimizes packaging stresses.

The masses are driven to oscillate about axes 28, 29 by an ASIC 33 which applies drive signals to parallel plate actuators 34 having interleaved electrode plates 36, 37 affixed to the gimbals and to the substrate. These plates are disposed in the plane of the gimbals and extend in directions parallel to the x and y axes. Thus, the plates which drive gimbal 18 and mass 16 extend in a direction parallel to the x axis, and the plates which drive gimbal 19 and mass 17 extend in a direction parallel to the y axis. Alternatively, The drive excitation force could be generated by comb drives or by magnetic or thermal actuators, if desired.

Since the overall dual-axis gyroscope has a single resonant mode that is excited as the drive-mode, a single drive control circuit is sufficient to achieve amplitude-regulated drive-mode oscillation of both masses in the system. Thus, the required ASIC for the dual-axis gyroscope will be much smaller and lower cost compared to two separate ASICs for two separate gyroscopes Electrode plates 39, 41 are mounted on the substrate beneath proof masses 16, 17 and form capacitors 42, 43 with the proof masses. These capacitors are connected to ASIC 33 for monitoring out-of-plane movement of the masses.

In operation, ASIC 33 applies drive signals to drive actuators 34, which causes gimbals 18,19 to oscillate about drive axes 28, 29 in opposite directions, with link 31 constraining the two gimbals for movement that is precisely out of phase and equal in magnitude. Beams 21, 22 constrain proof masses 16, 17 for torsional oscillation about the drive axes with the gimbals.

When the masses are rotated about the y axis or an axis parallel to the y axis, the Coriolis forces produced by that rotation cause proof mass 16 to rotate about the x axis, as illustrated in FIG. 4. When the masses are rotated about the x axis or an axis parallel to the x axis, the resulting Coriolis forces cause proof mass 17 to rotate about the y axis, as illustrated in FIG. 5. This out-of-plane rotation, and hence the rotation about the input axes, is detected by sensing capacitors 42, 43.

Since independent suspension members are utilized for the drive and sense modes, undesired dynamic coupling between the modes is minimized, and the resulting quadrature error and bias are suppressed.

Figure 6:
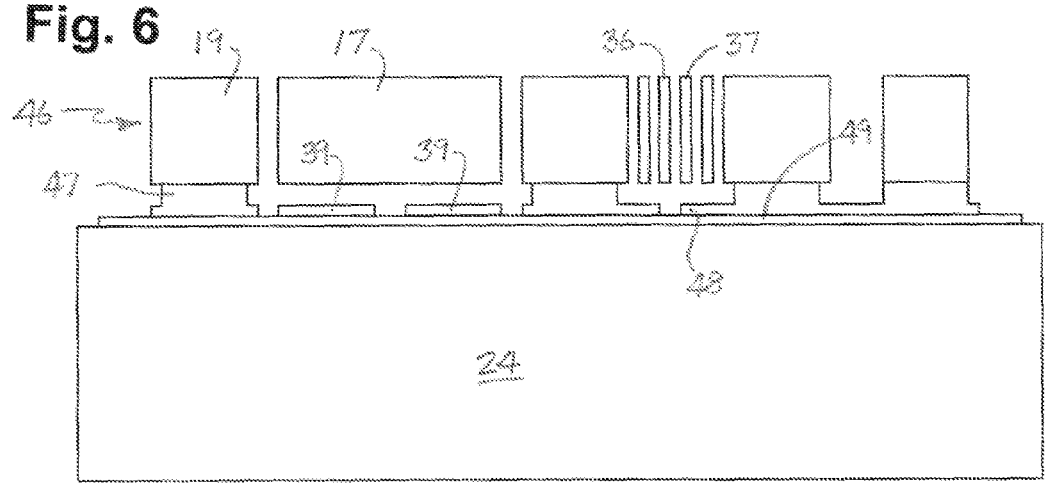
FIG. 6 is an enlarged, fragmentary cross-sectional view of the embodiment of FIG. 1.

As illustrated in FIG. 6, the moving parts of the rate sensor, e.g. proof masses 16,17 and gimbals 18,19, are formed in a device layer 46 of a material such as single-crystal silicon, polysilicon, metal, or other conductive material by cutting through the layer by a suitable MEMS technique such as deep-reactive-ion-etching. The device layer rests on anchor posts 47 which provide electrical and mechanical connection from interconnects 48 to the device layer. Out-of-plane electrodes 39 are located beneath the device layer and separated from it by the thickness or height of the anchor posts. The interconnects and the out-of-plane electrodes are formed in a conductive layer which is separated from substrate 24 by an insulative layer 49 that provides electrical isolation for the traces.

Figure 7:
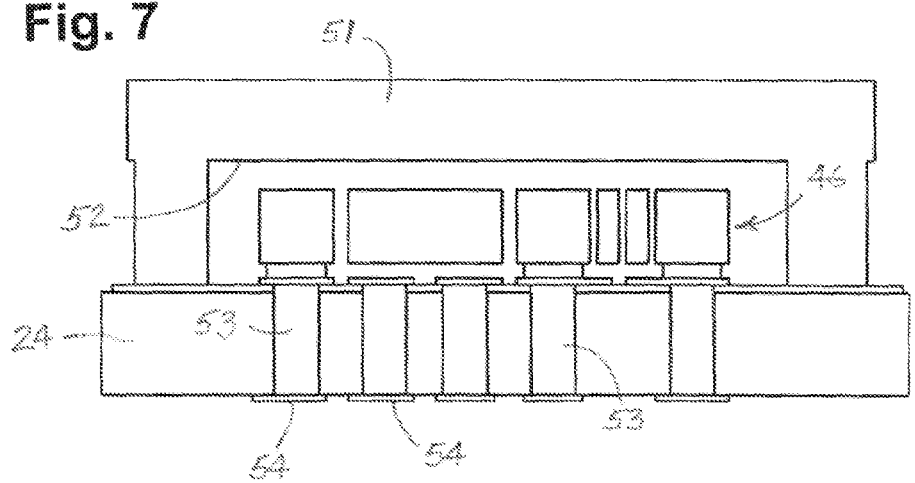
FIGS. 7 and 8 are vertical sectional views of the embodiment of FIG. 1 mounted in a hermetically sealed enclosure.

In the embodiment of FIG. 7, the rate sensor is vacuum packaged by means of a cap wafer 51 bonded to substrate 24, with device layer 46 being received in a cavity 52 in the cap wafer. This allows the rate sensor to operate in a vacuum with reduced air damping and enhanced mechanical response amplitude. Alternatively, the vacuum packaging could be done at die level by sealing the device package in vacuum. However, wafer-level vacuum packaging has a number of advantages, including cost, since a large number of devices can be vacuum packaged at the same time. Any suitable wafer bonding method that achieves a hermetic seal can be employed to bond the cap wafer to the device wafer. Electrical connections are routed outside the cavity by conductive vias 53 which pass through the substrate to bonding pads 54 on the outer side of the substrate. Alternatively, the vias can be routed through the cap wafer.

Figure 8:
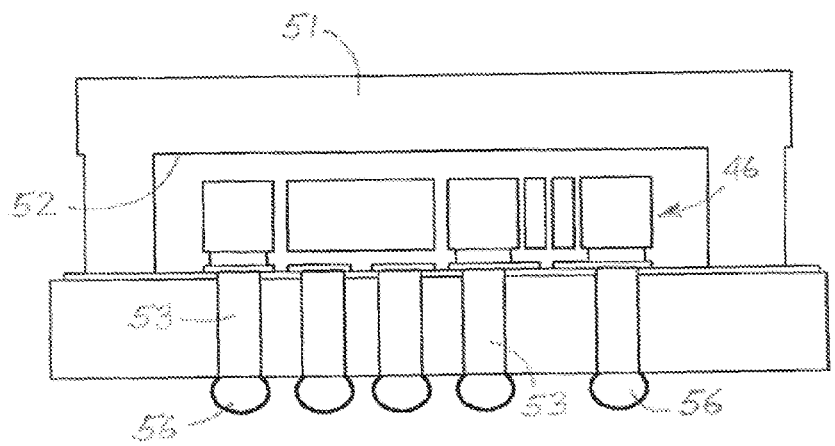

The embodiment of FIG. 8 is similar to the embodiment of FIG. 7 with balls of solder 56 at the outer ends of the vias. The balls of solder extend from the outer side of the substrate in a ball-grid-array.

Figure 9:
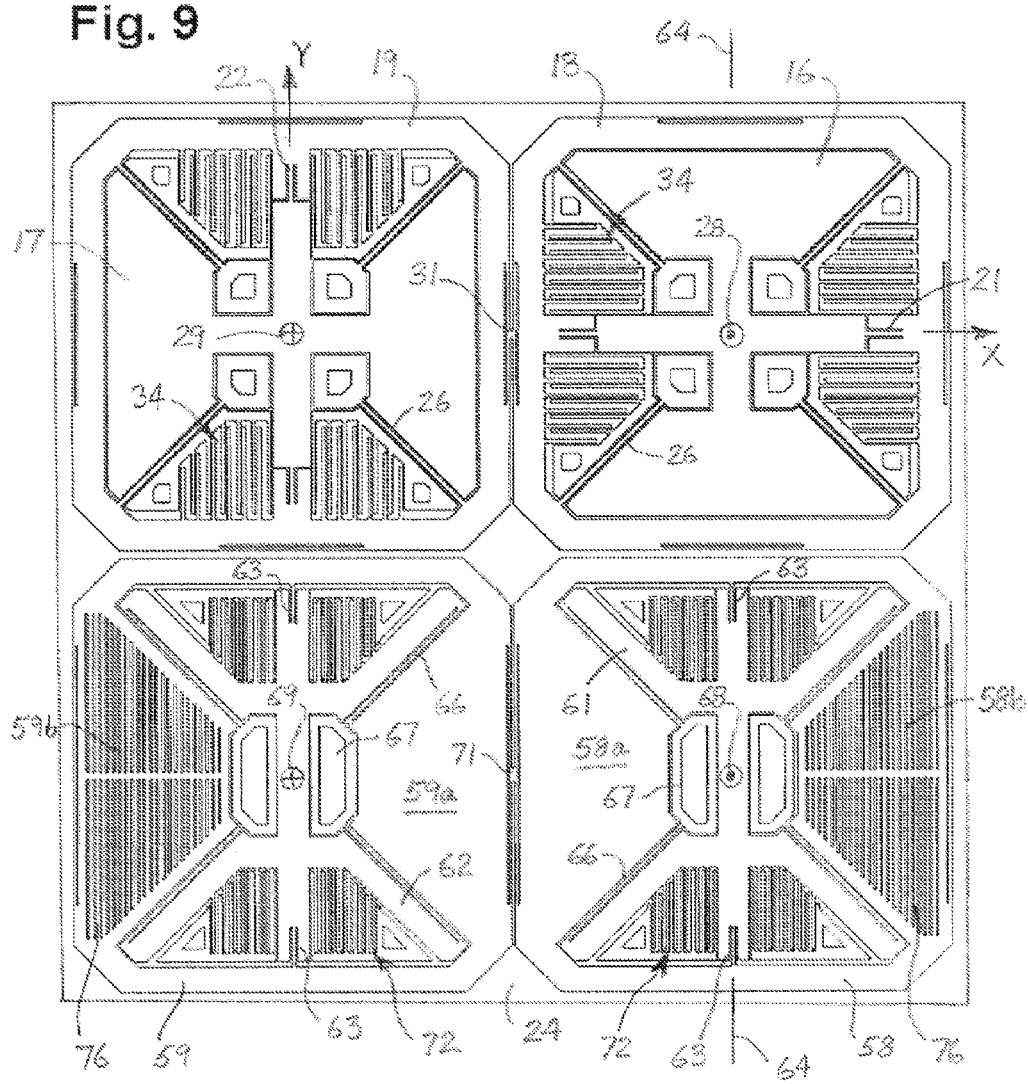
FIG. 9 is a top plan view of an embodiment of an angular rate sensor and dual axis accelerometer according to the invention.
Figure 10:
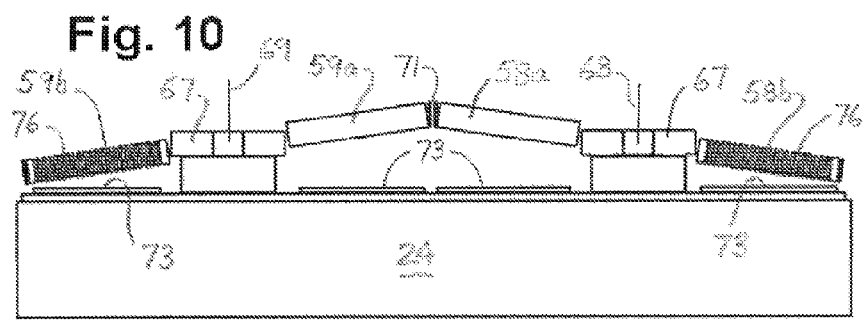
FIG. 10 is an enlarged, fragmentary cross-sectional view of the embodiment of FIG. 9.

FIG. 9 illustrates an embodiment in which a dual axis accelerometer is mounted on the same die with a dual axis rate sensor. The rate sensor is similar to the embodiment of FIG. 1, and like reference numerals designate corresponding elements in the two embodiments. The accelerometer includes a pair of generally planar masses 58, 59 which are mounted on substrate 24 beside proof masses 16, 17 in the x, y plane.

Masses 58, 59 are mounted on frames 61, 62 by torsion beams 63 which extend along the y axis and an axis 64 parallel to the y axis and constrain the mass for out-of-plane rotation about those axes. The frames are generally planar and are disposed in the x, y plane.

Frames 63 and accelerometer masses 58, 59 are suspended above substrate 24 by flexible beams, or flexures, 66 which extend between anchors 67 and the frames. These beams are flexible only in the x, y plane, and constrain the frames and the masses for in-plane torsional rotation about axes 68, 69 which are located at the centers of the masses and extend in a direction parallel to the z axis and perpendicular to the substrate and to the frames.

The use of independent suspension beams for response to acceleration along the y and z axes decouples the two modes of acceleration and minimizes cross-axis sensitivity.

The mid points of the adjacent edges of masses 58, 59 are connected together by a coupling link 71 which constrains the two masses strictly for anti-phase movement of equal magnitude both in plane and out of plane. This makes the overall accelerometer system symmetrical, and prevents sensitivity to angular acceleration.

In-plane rotation of the masses is monitored by capacitors 72 having plates affixed to the frames and to the substrate, and out-of-plane rotation is monitored by capacitors formed by the masses themselves and by electrodes 73 mounted on the substrate beneath the masses.

Masses 58, 59 are formed so that the sections of the masses on opposite sides of axes 64, 68, 69 and the y axis have different moments of inertia. In that regard, slots or trenches 76 are formed in the outer sections 58*a*, 59*a* of the masses, while the inner sections 58*b*, 59*b* are solid. Thus, the inner sections have greater mass and, hence, greater moments of inertia than the outer sections. The slots or trenches can either extend all the way through the masses or just through one surface. In the embodiment illustrated, the accelerometer masses are symmetrical in shape with respect to the axes about which they pivot. However, they do not have to be symmetrical, although it is preferable that the portions of the masses which interact with electrodes 73 to form capacitors 72 be symmetrical.

Figure 11:
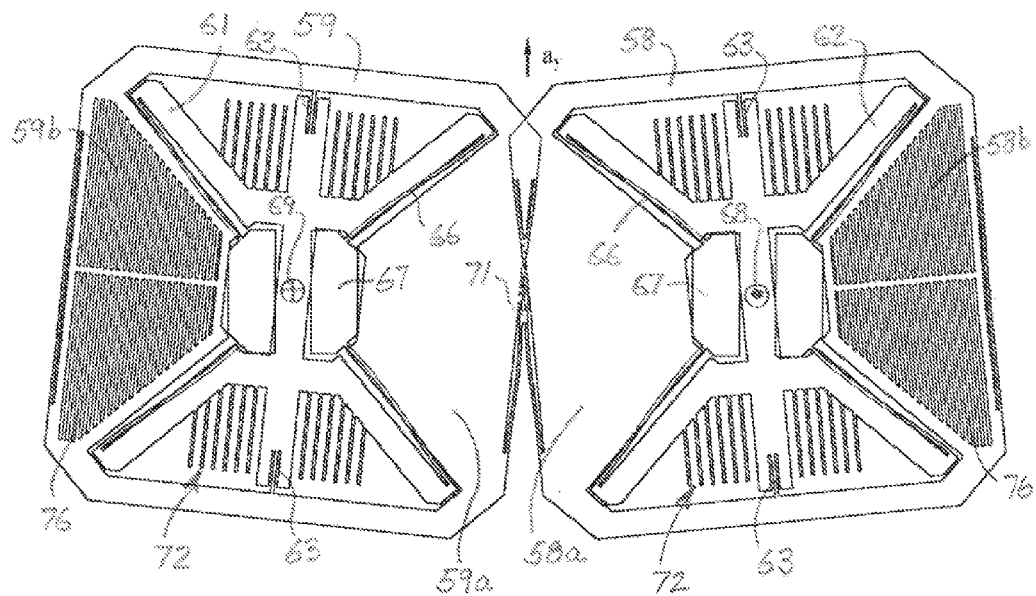
FIGS. 11 and 12 are operational views, illustrating the response of the embodiment of FIG. 9 to acceleration along axes in the plane of the device and perpendicular to the plane of the device.
Figure 12:
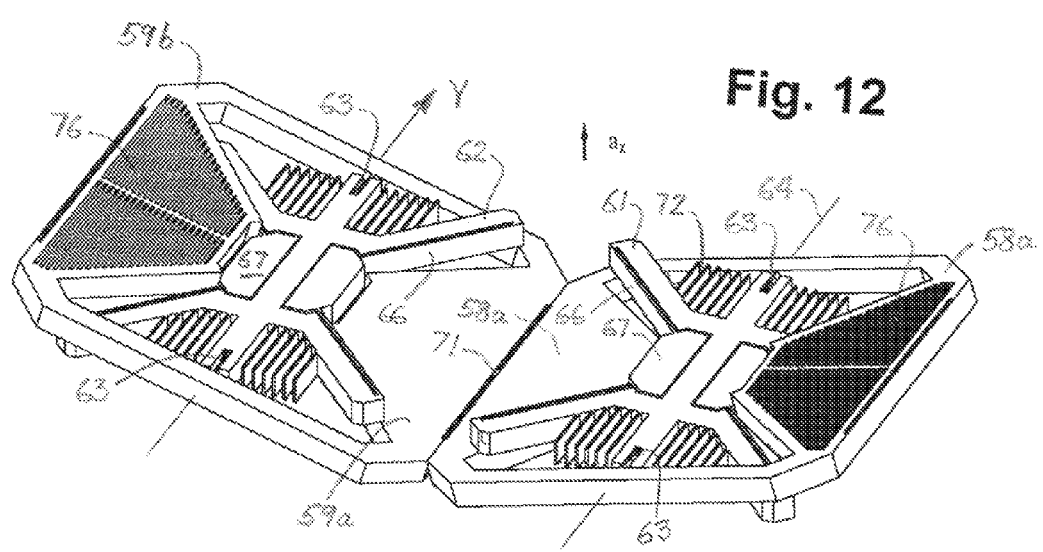

With the mass imbalance between the two sides of masses 58, 59, a linear acceleration in y and z directions results in a net moment which causes the masses to deflect torsionally about their respective centers. Thus, acceleration in the y direction causes the masses to rotate in-plane about axes 68, 69, as illustrated in FIG. 11, and acceleration in the z direction causes them to rotate out-of-plane about axis 64 and the y axis, as illustrated in FIG. 12. For both in-plane and out-of-plane rotation, link 71 constrains the two masses for rotation together in opposite directions.

The invention has a number of important features and advantages. It provides a single device for measuring angular rate about two orthogonal axes, with the drive oscillators for two sensing elements being coupled together and functioning as a single oscillator. It eliminates the need for two separate drive control circuits for dual-axis angular rate detection, and allows the use of just one ASIC instead of two. The single ASIC is both smaller in size and less costly than two separate ASICs would be.

In addition, since only a single package is required for the dual-axis gyroscope, the packaging cost is significantly lower than it would be for two gyroscopes packaged separately. A single package will also result in a lesser number of failure modes and a lower probability of failure of the complete unit. Moreover, the cost of a single MEMS sensing element die will be lower than that of two separate MEMS dice since it requires less back-end processing such as dicing, testing, die attachment, and wire-bonding.

It is apparent from the foregoing that a new and improved angular rate sensor has been provided. While only certain presently preferred embodiments have been described in detail, as will be apparent to those familiar with the art, certain changes and modifications can be made without departing from the scope of the invention as defined by the following claims.

The invention claimed is:

1. A rate sensor for detecting rotation about first and second mutually perpendicular axes, comprising first and second masses coupled together for torsional drive mode oscillation of equal amplitude and opposite phase about third axes which are perpendicular to the first and second axes, the first mass being mounted for oscillation about the second axis in response to Coriolis forces produced by rotation about the first axis, and the second mass being mounted for oscillation about the first axis in response to Coriolis forces produced by rotation about the second axis.

2. The rate sensor of claim 1 wherein the masses are generally planar and disposed side-by-side, with the first and second axes lying in a plane with the masses and the third axes being perpendicular to the plane.

3. The rate sensor of claim 1 wherein the masses are mounted in gimbals for torsional movement independently of each other about the first and second axes, and the gimbals are constrained for torsional movement of equal amplitude and opposite phase about the third axes.

4. The rate sensor of claim 3 including electrodes for driving the gimbals to oscillate torsionally about the third axes.

5. The rate sensor of claim 1 together with a pair of accelerometer masses which are connected together for torsional movement of equal amplitude and opposite phase about axes parallel to the third axes in response to acceleration along the second axis and for torsional movement of equal amplitude and opposite phase about axes parallel to the second axis in response to acceleration along the third axes.

6. A rate sensor for detecting rotation about first and second mutually perpendicular axes, comprising a generally planar substrate, first and second gimbals mounted on the substrate and constrained for in-plane torsional drive mode oscillation of equal amplitude and opposite phase about drive axes which are perpendicular to the first and second axes, first and second generally planar masses, torsionally flexible beams mounting the first mass in the first gimbal and constraining the first mass for in-plane drive mode oscillation with the first gimbal and for out-of-plane rotation about the first axis in response to Coriolis forces produced by rotation about the second axis, and torsionally flexible beams mounting the second mass in the second gimbal and constraining the second mass for in-plane drive mode oscillation with the second gimbal and for out-of-plane rotation about the second axis in response to Coriolis forces produced by rotation about the first axis.

7. The rate sensor of claim 6 wherein the gimbals are mounted on the substrate by beams which extend between the gimbals and anchors on the substrate and are flexible only in the plane of the gimbals.

8. The rate sensor of claim 7 wherein the anchors are positioned toward the centers of the masses.

9. The rate sensor of claim 6 including capacitor plates mounted on the substrate beneath the masses for monitoring the out-of-plane rotation of the masses about the first and second axes.

10. The rate sensor of claim 6 including a cap wafer bonded to the substrate, with the gimbals, the masses and the beams being hermetically sealed in a cavity in the cap wafer.

11. The rate sensor of claim 10 including electrical conductors passing through the substrate.

12. The rate sensor of claim 11 including bonding pads connected electrically to the conductors on the side of the substrate opposite the masses.

13. The rate sensor of claim 11 including balls of solder connected electrically to the conductors on the side of the substrate opposite the masses.

14. The rate sensor of claim 6 including a pair of generally planar accelerometer masses mounted on the substrate beside the first and second masses and connected together for in-plane rotation of equal amplitude and opposite phase about axes parallel to the drive axes in response to acceleration along the second axis and for out-of-plane rotation of equal amplitude and opposite phase about pivot axes parallel to the second axis in response to acceleration along the drive axes.

15. The rate sensor of claim 14 wherein the accelerometer masses are mounted on frames by torsionally flexible beams which extend along the pivot axes and constrain the accelerometer masses for in-plane rotation with the frames and for out-of-plane rotation relative to the frames, and the frames are mounted on the substrate by beams which constrain the frames for in-plane rotation.

16. The rate sensor of claim 14 wherein the accelerometer masses are formed in two sections with unequal moments of inertia about the pivot axes.

17. The rate sensor of claim 16 wherein the accelerometer masses are symmetrical in shape about the pivot axes but the two sections of each of the accelerometer masses have different masses.

18. The rate sensor of claim 14 including electrode plates on the substrate beneath the accelerometer masses for monitoring the out-of-plane rotation of the accelerometer masses, and slots opening through at least one surface of one of the sections of each of the accelerometer masses.

19. The rate sensor of claim 18 wherein portions of the accelerometer masses which are symmetrical in shape relative to the pivot axes overlap with the electrode plates to form capacitors for monitoring the out-of-plane movement of the accelerometer masses.

20. A device for monitoring rate of rotation about mutually perpendicular first and second axes which lie in a plane and acceleration along a third axis perpendicular to the plane and along an axis in the plane, comprising: a substrate, first and second generally planar masses mounted side-by-side on the substrate and coupled together for in-plane torsional drive mode oscillation of equal amplitude and opposite phase about drive axes which are perpendicular to the plane, the first mass being mounted for out-of-plane rotational movement about the second axis in response to Coriolis forces produced by rotation about the first axis, and the second mass being mounted for out-of-plane torsional movement about the first axis in response to Coriolis forces produced by rotation about the second axis, a pair of accelerometer masses mounted on the substrate beside the first and second masses and connected together for in-plane rotation of equal amplitude and opposite phase about axes perpendicular to the plane in response to acceleration along an axis in the plane and for out-of-plane rotation of equal amplitude and opposite phase about pivot axes in the plane in response to acceleration along the third axis.

21. The rate sensor of claim 20 wherein the accelerometer masses are mounted for in-plane rotation about the axes perpendicular to the plane in response to acceleration along any one of the mutually perpendicular axes.

22. The rate sensor of claim 20 wherein the pivot axes are parallel to one of the mutually perpendicular axes.

23. The rate sensor of claim 20 wherein the first and second masses are mounted in gimbals for out-of-plane rotation independently of each other about the mutually perpendicular axes, and the gimbals are constrained for in-plane oscillation of equal amplitude and opposite phase about the drive axes.

24. The rate sensor of claim 20 wherein the accelerometer masses are mounted on frames by torsionally flexible beams which extend along the pivot axes and constrain the accelerometer masses for in-plane rotation with the frames and for out-of-plane rotation relative to the frames, and the frames are mounted on the substrate by beams which constrain the frames for in-plane rotation.

25. A device for monitoring acceleration along a first axis which lies in a plane and a second axis which is perpendicular to the plane, comprising: a substrate, a pair of generally planar masses which are disposed in the plane, means mounting the masses on the substrate for in-plane torsional movement of equal amplitude and opposite phase about the second axis in response to acceleration along the first axis and for out-of-plane torsional movement of equal amplitude and opposite phase about pivot axes which lie in the plane in response to acceleration along the second axis.

26. The rate sensor of claim 25 wherein the masses are mounted on frames by torsionally flexible beams which extend along the pivot axes and constrain the masses for in-plane torsional movement with the frames and for out-of-plane torsional movement relative to the frames, and the frames are mounted on the substrate by beams which constrain the frames for in-plane torsional movement about the second axis.

27. The rate sensor of claim 25 wherein the masses are formed in two sections with unequal moments of inertia about the pivot axes.

28. The rate sensor of claim 27 wherein the masses are symmetrical in shape about the pivot axes but the two sections of each of the masses have different masses.

29. The rate sensor of claim 25 including electrode plates on the substrate beneath the masses for monitoring the out-of-plane movement of the masses, and slots opening through at least one surface of one of the sections of each of the masses.

30. The rate sensor of claim 29 wherein portions of the masses which are symmetrical in shape relative to the pivot axes overlap with the electrode plates to form capacitors for monitoring the out-of-plane movement of the masses.

* * * * *